United States Patent [19]

Ogihara et al.

[11] Patent Number: 5,303,117
[45] Date of Patent: Apr. 12, 1994

[54] ELECTROSTATIC POSITIONER

[75] Inventors: Masaaki Ogihara, Tokyo; Michio Aoyama, Kitakyushu; Tsumoru Fujii, Ichikawa; Yuji Ikegami, Chiba; Joji Shinohara, Tokyo, all of Japan

[73] Assignee: Ishikawajima-Harima Jukogyo Kabushiki Kaisha, Tokyo, Japan

[21] Appl. No.: 74,283

[22] Filed: Jun. 9, 1993

Related U.S. Application Data

[63] Continuation of Ser. No. 883,899, May 12, 1992, abandoned, which is a continuation of Ser. No. 483,362, Feb. 22, 1990, abandoned.

[30] Foreign Application Priority Data

| Feb. 23, 1989 | [JP] | Japan | 1-44930 |
| Mar. 14, 1989 | [JP] | Japan | 1-61902 |
| Nov. 9, 1989 | [JP] | Japan | 1-289913 |
| Nov. 21, 1989 | [JP] | Japan | 1-300752 |
| Nov. 30, 1989 | [JP] | Japan | 1-309419 |

[51] Int. Cl.⁵ .......................................... H02N 13/00
[52] U.S. Cl. .............................. 361/233; 156/DIG. 62
[58] Field of Search ............... 361/230, 233, 234, 144; 310/90, 90.5; 156/DIG. 62; 244/1 R, 159, 161, 163, 158 R; 219/7.5

[56] References Cited

U.S. PATENT DOCUMENTS

| 3,885,301 | 5/1975 | Murayama | 205/165 |
| 3,899,969 | 8/1975 | Taylor | 430/124 |
| 4,061,043 | 12/1977 | Stiles | 74/5.6 D |
| 4,218,921 | 8/1980 | Oran et al. | 73/505 |
| 4,521,854 | 6/1985 | Rhim | 364/400 |
| 4,896,849 | 1/1990 | Moynihan | 244/158 R |
| 4,970,905 | 11/1990 | McClennen et al. | 73/864.34 |
| 4,980,797 | 12/1990 | Blomgren, Jr. | 361/233 |
| 5,155,651 | 10/1992 | Yoda et al. | 361/144 |
| 5,196,999 | 3/1993 | Abe | 219/7.5 |

OTHER PUBLICATIONS

Review Of Scientific Instruments -S. Arnold; L. M. Folan; "Fluorescence Spectrometer For a Single Electrodynamically Levitated Microparticle", Sep. '86, vol. 57, No. 9, pp. 2250-2253.
Journal Of Crystal Growth-Eyer; Nitsche; Zimmerman; "A Double-Ellipsoid Mirror Furnace for Zone Crystallization Experiments in Spacelab" Aug. 1979; vol. 47, No. 8, pp. 219-229.
1986 IEEE Industry Applications Society Annual Meeting: Conference Record-W. K. Rhim; S. K. Chung, etc.; "Large Charged Drog Levitation Against Gravity" 1986, vol. 2, pp. 1338-1341.
W. K. Rhim, et al., "Development of an Electrostatic Positioner for Space Material Processing" Feb. 1985; Review of Scientific Instruments, pp. 307-317.

*Primary Examiner*—A. D. Pellinen
*Assistant Examiner*—Richard T. Elms

[57] ABSTRACT

An electrostatic positioner with one or more first electrodes for producing forces to confine a charged specimen in the direction perpendicular to a center axis and second electrodes for producing forces to confine the charged specimen in the direction of the center axis.

6 Claims, 6 Drawing Sheets

15 DC power supply

14 AC power supply or AC power supply superposed with DC

ELECTROSTATIC POSITIONER

This application is a continuation of application Ser. No. 07/883.899, filed May 12, 1992 (now abandoned) which was a continuation of application Ser. No. 07/483,362 filed Feb. 22, 1990 (now abandoned).

BACKGROUND OF THE INVENTION

The present invention relates to an electrostatic positioner which utilizes electrostatic force to retain a body in a stationary levitation state in a vessel without contact.

In recent intensive research and development of novel materials, it has been proposed to develop novel materials not on the earth but in cosmic space where extremely small gravity is utilized to keep a raw material levitated in a stationary non-contact state at one point in the space for carrying out heating, melting, solidifying or other processes of the material. Realization of such proposal will require development of not only techniques for retaining a body in a stationary non-contact state at one point in the space but also techniques for heating or melting of a retained body.

One of the techniques for retaining a body in a stationary levitation state is to use electrostatic field where any charged body can be retained in a levitation state in the space. In accordance with this concept, practical electrostatic positioners have been proposed.

Such conventional electrostatic positioners are disclosed, for example, in U.S. Pat. No. 4,521,854 and in an article entitled "Development of an electrostatic positioner for space material processing" in REVIEW OF SCIENTIFIC INSTRUMENTS, Vol. 56, No. 2, February 1985, pp. 307-317. In a typical example shown in FIG. 1, a pair of dish-like electrodes 1 are vertically spaced apart from each other to produce an electric field therebetween, using a DC power supply 2. In another typical example shown in FIG. 2, four spherical electrodes 3 are disposed at vertexes of a tetrahedron and are respectively connected to their independent DC power supplies 4 to establish an electric field in an inner space of the tetrahedron defined by the electrodes 3. Voltage of the power supply 2 or 4 is controlled such that any deviation in position of the charged body in the electric field defined by the electrodes 1 or 3 is compensated or corrected.

The above-mentioned apparatuses in which the electric field is established by merely applying the direct current to the electrodes 1 or 3 will require monitoring of any deviation in position of the charged body by a video camera or the like as well as control of the power supply 2 or 4 so as to return the body to its stabilized position at a faster response time in response to the monitored result, resulting in technical difficulties in position control of the charged body and in retaining the body in the stationary levitation state.

No confining forces for restricting the body in the lateral directions exist in the electric field established between the disk-like electrodes 1. Such lateral restricting forces are weak even in the electric field established by the spherical electrodes 3. Thus, it arises a problem that the levitated body is liable to laterally escape.

In order to overcome these problems, an apparatus was proposed in which grid-shaped electrodes are used (Japanese Patent Application No. 296782/1988). For instance, as shown in FIG. 3, two pairs of parallel rod-like electrodes 5 are made to intersect in mutually perpendicular relationship, thereby defining a space in the form of a cube. Each electrodes 5 pair is connected to an AC power supply 6 or an AC power supply with direct current component superposed on alternating current.

The electrostatic positioner comprising such even number of rod-shaped electrodes 5 defining a cubic space and connected to the AC power supply 6 has both voltage and frequency controls unlike the apparatuses using the dish-shaped or spherical electrodes 1 or 3, so that it has improved capability for position-controlling of the levitated body. However, the range or zone of effective position control of the levitated body is small so that it remains difficult to maintain the body in the stationary levitation state in a stabilized manner.

The present invention was made to overcome the above and other problems in the conventional apparatuses and has its object to provide an electrostatic positioner having a wide range or zone in which the levitated body can be effectively position-controlled in a stabilized manner.

The present invention will become more apparent from the following description of some preferred embodiments thereof taken in conjunction with the accompanying drawings.

BRIEF DESCRIPTION OF THE DRAWINGS

The same reference numerals are used to designate similar parts throughout the figures.

DETAILED DESCRIPTION OF THE PREFERRED EMBODIMENTS

Figure 1:
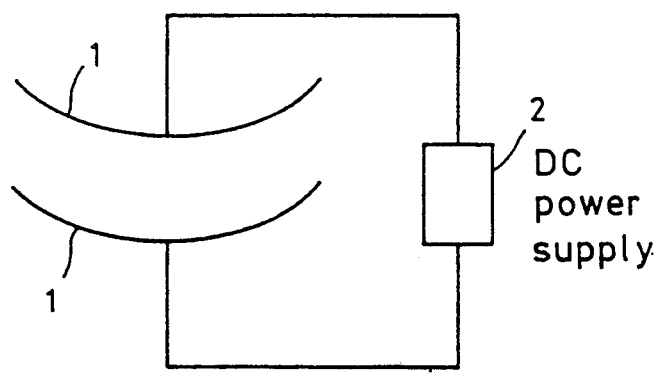
FIG. 1 is a view used to explain a conventional electrostatic positioner.
Figure 2:
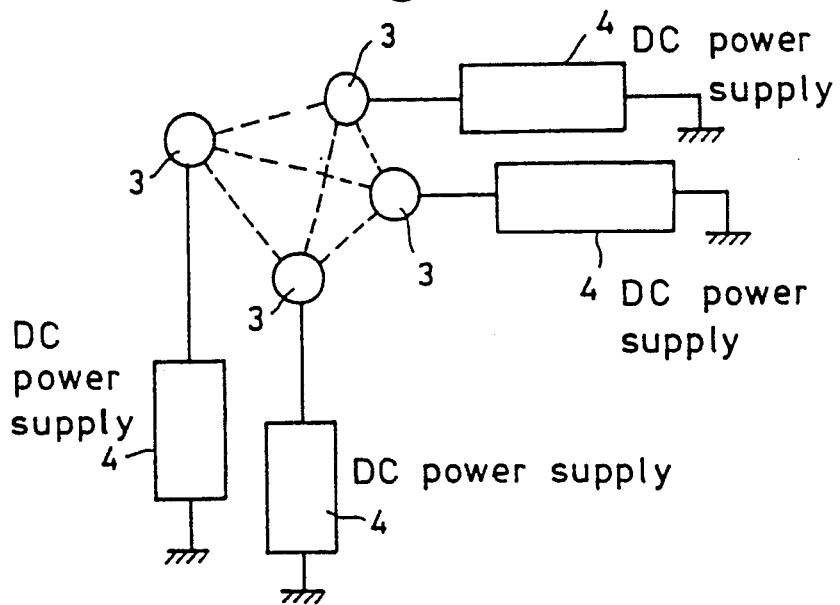
FIG. 2 is a view used to explain another conventional positioner.
Figure 3:
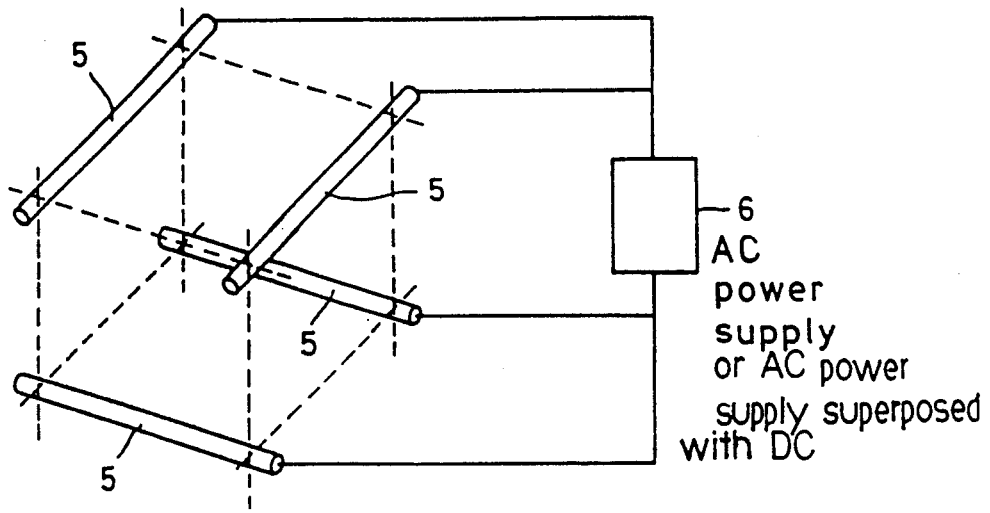
FIG. 3 is a view used to explain a further conventional positioner.
Figure 4:
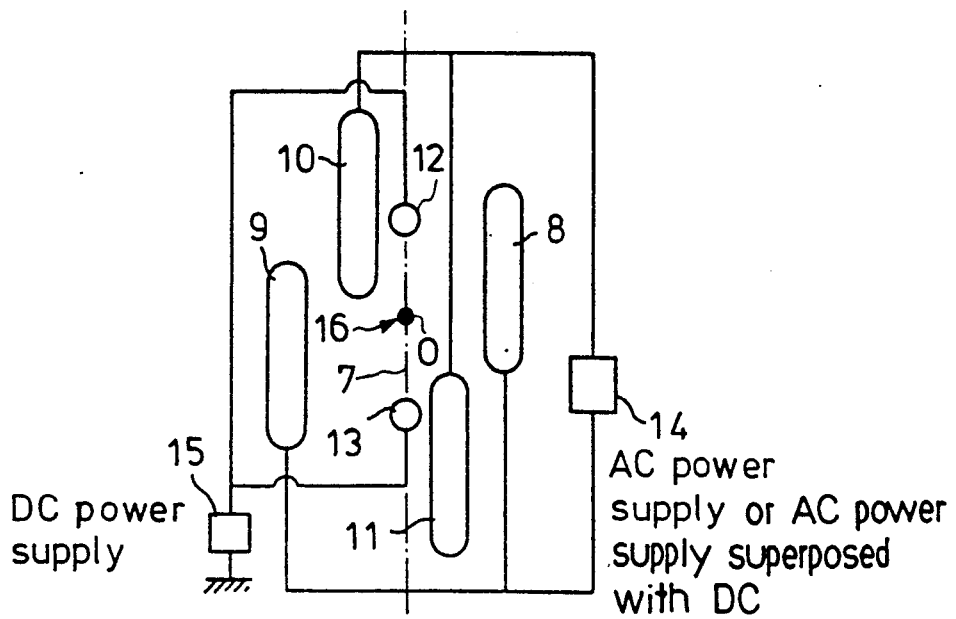
FIG. 4 is a view used to explain a first preferred embodiment of the present invention.
Figure 5:
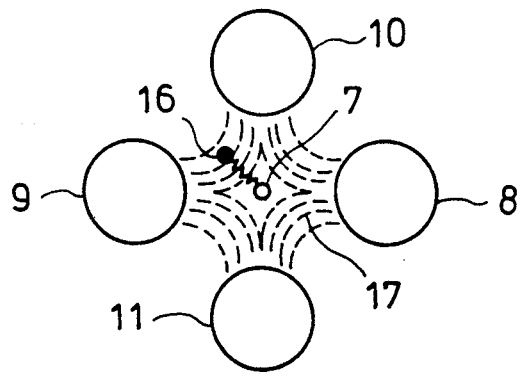
FIG. 5 is a view used to explain the movement of a specimen in the first embodiment shown in FIG. 4.
Figure 6:
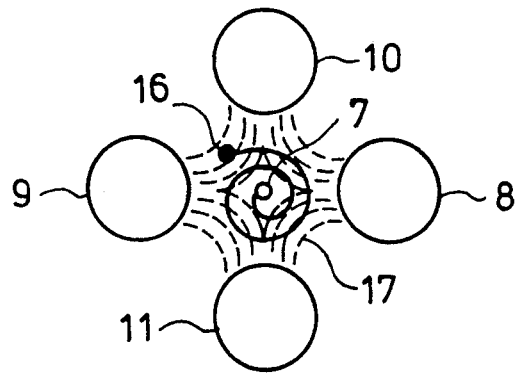
FIG. 6 is a view used to explain the movement different from that explained with reference to FIG. 5.

Referring first to FIGS. 4, 5 and 6, a first preferred embodiment of the present invention will be described.

In space, an original point 0 and a center axis 7 passing the point 0 preferably vertically are determined. Four first cylinder-shaped electrodes 8, 9, 10 and 11 are disposed in parallel, as parallel bars, with the axis 7 and at positions which are equidistantly spaced from the axis 7 and are vertexes of a square viewed from the direction of the axis 7. Within the space defined by the first electrodes 8-11, two second spherical electrodes 12 and 13 are disposed in a vertically spaced-apart relationship on the axis 7.

Of the first electrodes 8-11, diagonally opposed pairs 8 and 9 and 10 and 11 are respectively electrically connected to an AC power supply 14. The second electrodes 12 and 13 are electrically connected to a DC power supply 15. Reference numeral 16 denotes an electrically charged specimen.

The AC power supply used is a power supply containing at least alternating current component. For instance, an AC power supply for supplying alternating current only or superposed with direct current component is used.

The AC power supply 14 is functioned such that, depending upon mass, charge, diameter and the like of the specimen 16, frequency of the supply 14 can be varied from a lower level of the order of 1 Hz to a higher level of the order of hundreds Hz.

When AC voltage is applied from the supply 14 to the cylindrical first electrodes 8-11, the positive and negative poles (+ and −) of the electrode pairs 8 and 9 and 10 and 11 are alternately changed so that, as shown in FIGS. 5 and 6, electric lines of force 17 are produced between the electrodes 8-11. Since the electric lines of force 17 are curved toward the axis 7, the charged specimen 16 approaches toward the axis 7 while oscillating along the electric lines of force 17 as shown in FIG. 5 at a frequency approximately equal to the frequency of the AC power supply 14; alternatively, it makes a spiral motion as shown in FIG. 6 in approach toward the center axis 7. Finally, the specimen 16 is retained on the center axis 7 in the stationary state. On the other hand, the direct current having the same polarity with that of the charged specimen 16 is applied from the DC power supply 15 to the second electrodes 12 and 13 so that Coulomb's force (that is, electrical repelling force) is produced between the second electrodes 12 and 13 and the specimen 16. The Coulomb's force thus produced is balanced with the mass of the specimen 16 and the specimen 16 is retained in the stationary levitation state in a stabilized manner also in the direction of the center axis 7.

Figure 7:
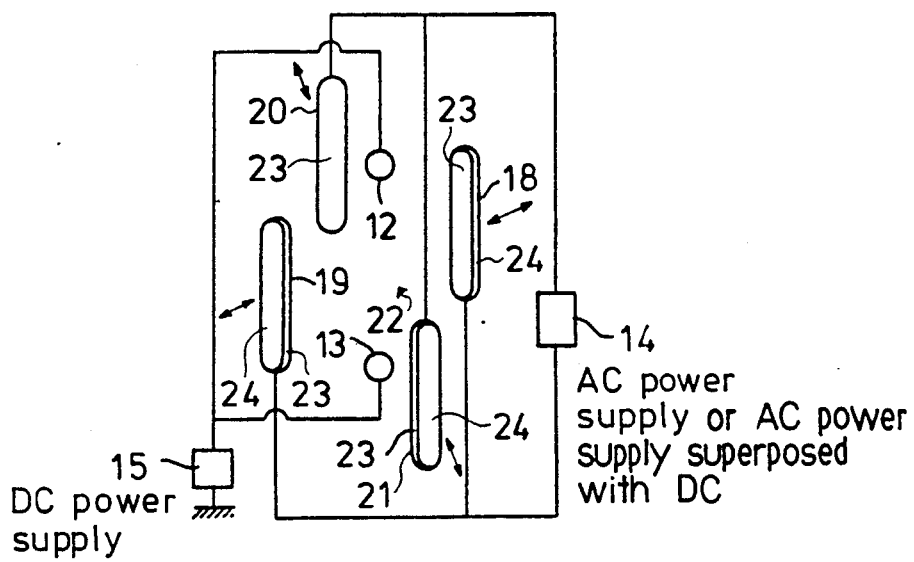
FIG. 7 is a view used to explain a second preferred embodiment of the present invention.
Figure 8:
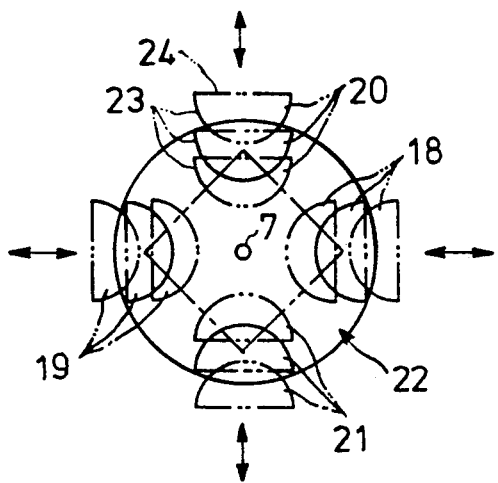
FIG. 8 illustrates the movement of first electrodes in the second embodiment shown in FIG. 7.
Figure 9:
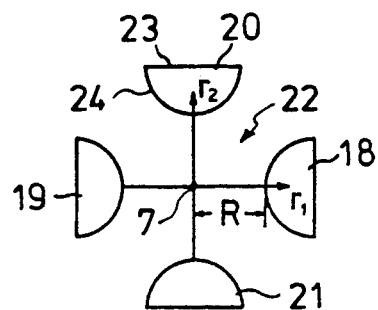
FIG. 9 is a view used to explain a shape of an arcuate convex surface of the first electrodes used in the second embodiment shown in FIG. 7.

Referring next to FIGS. 7, 8 and 9, a second preferred embodiment of the present invention will be described in which the first electrodes 18-21 are in the form of a semicircular column having an arcuate convex surface 23 extending toward the space 22 defined by the first electrodes 18-21 and a flat surface 24 away from the space 22. The first electrodes 18-21 are so designed and constructed as to be movable in mutually perpendicular radial directions $r_1$ and $r_2$ of the center axis 7.

According to the second embodiment, the same effects as those of the first embodiment described above are attained. In view of the fact that an outward half of each of the cylindrical electrodes 8-11 in FIG. 5 or 6 is unnecessary for levitation of the specimen 16, the first electrodes 18-21 of the second embodiment are made in the form of a semicircular cylinder. This contributes to making the apparatus compact in size and light in weight while positively ensuring the specimen 16 being retained in the levitation state in a stabilized manner.

Moreover, the first electrodes 18-21 of the second embodiment are arranged to move independently so that the electric lines of force 17 can be produced with the electrodes 18-21 being near or away from the center axis 7. When the specimen 16 has a larger diameter, the distances between the first electrodes 18-21 are increased to apply a high voltage between the electrodes 18-21; as the result, the electrostatic forces can be increased to readily float the large-diameter specimen 16. If four first electrodes are not movable and electric discharges occur between the first electrodes, the voltage applied to the electrodes has dropped for the electric breakdown; but according to the second embodiment, the distances between the four first electrodes may be increased to suppress any electric discharges, which will eliminate any necessity of dropping the voltage applied in case of any electric discharges occurring. Therefore, electric force sufficient to levitate the specimen can be easily ensured.

In the second embodiment, the cross section of the first electrodes may be in the shape of a crescent or a fan. The arcuate convex surface of each of the first electrodes 18-21 may be defined by a curved surface which in turn is defined by an orthogonal hyperbola expressed by the equation $$r_1 - r_2 = \pm R^2$$

wherein R is one half of the distance between the opposed convex surfaces of the first electrodes as shown in FIG. 9.

The first electrodes may be so designed and constructed that only one of the electrodes opposed with respect to the axis 7 is movable.

Figure 10:
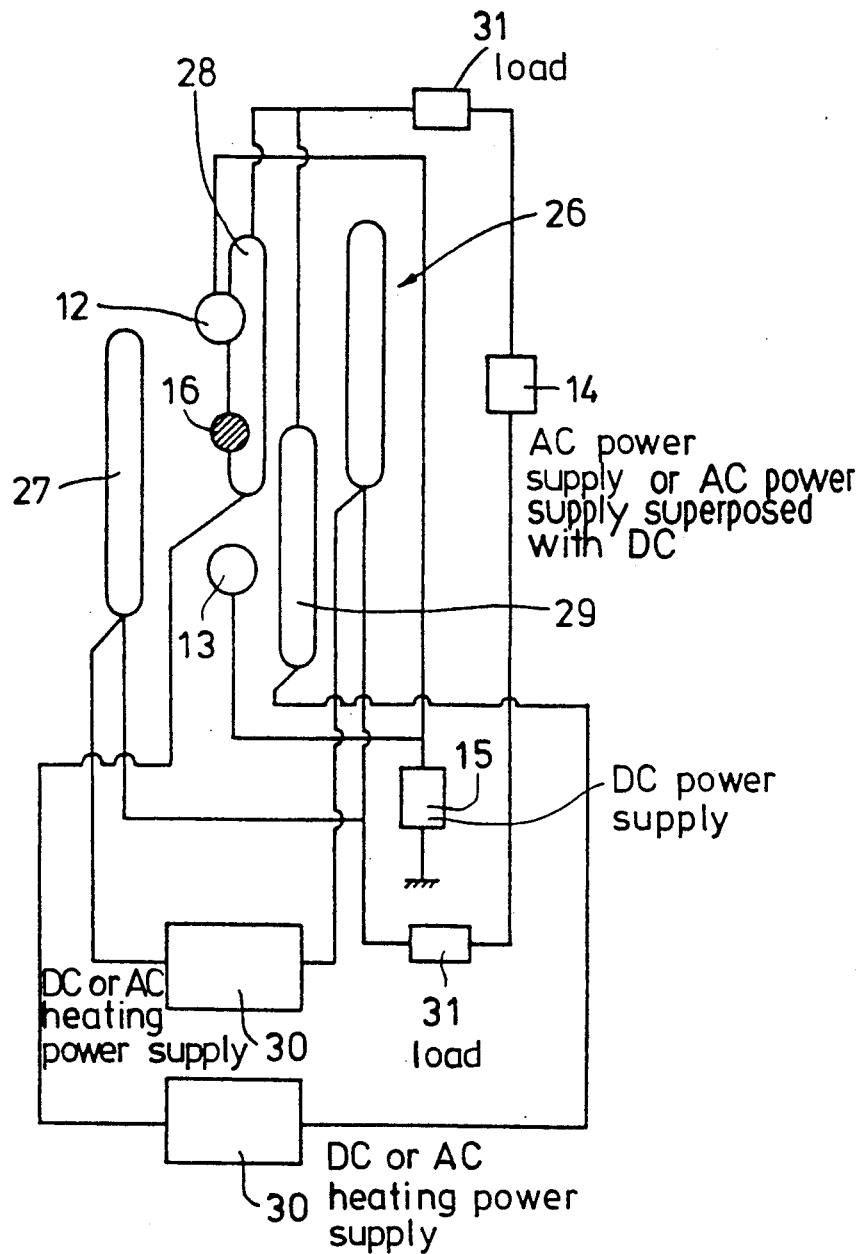
FIG. 10 is a view used to explain a third preferred embodiment of the present invention.
Figure 11:
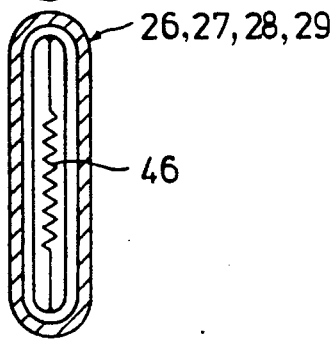
FIG. 11 is a view used to explain the first electrode used in the third embodiment shown in FIG. 10.

Next referring to FIG. 10, a third embodiment of the present invention will be described in which the first electrodes 26, 27, 28 and 29 are provided with heat emitting portions like metal or graphite heaters which emit heat through energization by electric current. Alternatively, heating elements 46 for emitting heat through energization by electric current are disposed in the first electrodes 26-29 as shown in FIG. 11. The heat emitting portions or heating elements 46 are electrically connected to a DC or AC heating power supply 30.

It should be noted that a load 31 is incorporated between the first electrodes 26-29 and the AC power supply 14 to exhibit impedance sufficient to prevent the current from the heating power supply 30 from flowing into the AC power supply 14.

The third embodiment can attain the same effects as those attained by the other embodiments. Furthermore, the first electrodes 26-29 receive the current from the heating power supply 30 and are allowed to heat by their own resistance and their Joule's heat is transmitted to the specimen 16 by convection and radiation in the gas atmosphere. Especially in vacuum such as cosmic space, the heat is transmitted to the specimen 16 mainly by radiation to heat or melt the specimen 16.

In this case, the load 31 which exhibit a degree of impedance depending upon the type of the heating power supply 30 is inserted into the AC power supply 14, thereby eliminating any adverse effect due to the flow of the current from the heating power supply 30.

Thus the first electrodes 26-29 serve also as heating sources so that it becomes simple to design and construct a heating furnace. Then, any shielding and cooling means for the first electrodes 26-29 can be eliminated.

Figure 12:
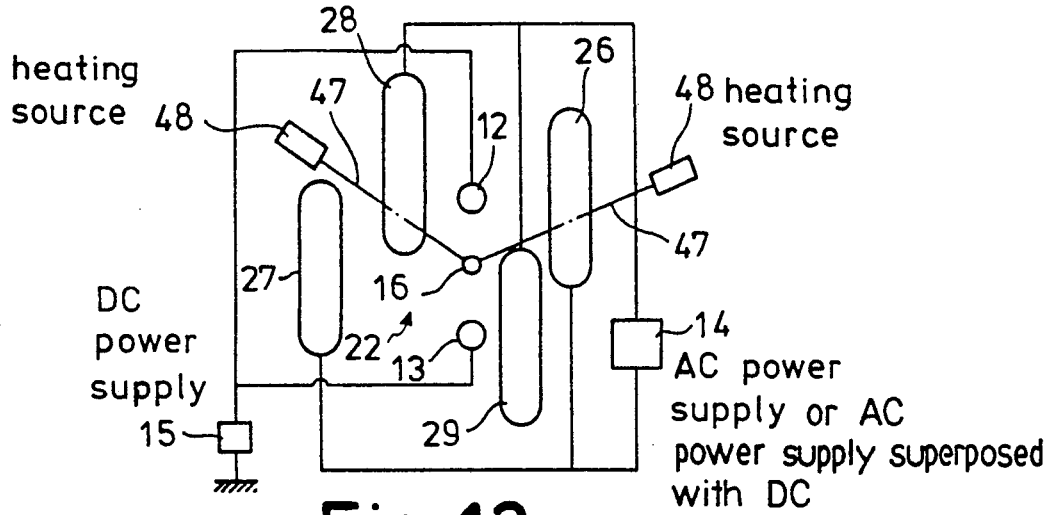
FIG. 12 is a view used to explain a first modification of the third embodiment shown in FIG. 10.

FIG. 12 illustrates a first modification of the third embodiment in which, instead of the first electrodes 26-29 themselves being directly heated, heating sources 48 in the form of laser means or the like for radiating heating rays 47 such as laser beam or the like to the specimen 16 are disposed outwardly of the inner space 22 defined by the first electrodes 26-29. This modification can attain the same effects as those attained by the third embodiment.

Figure 13:
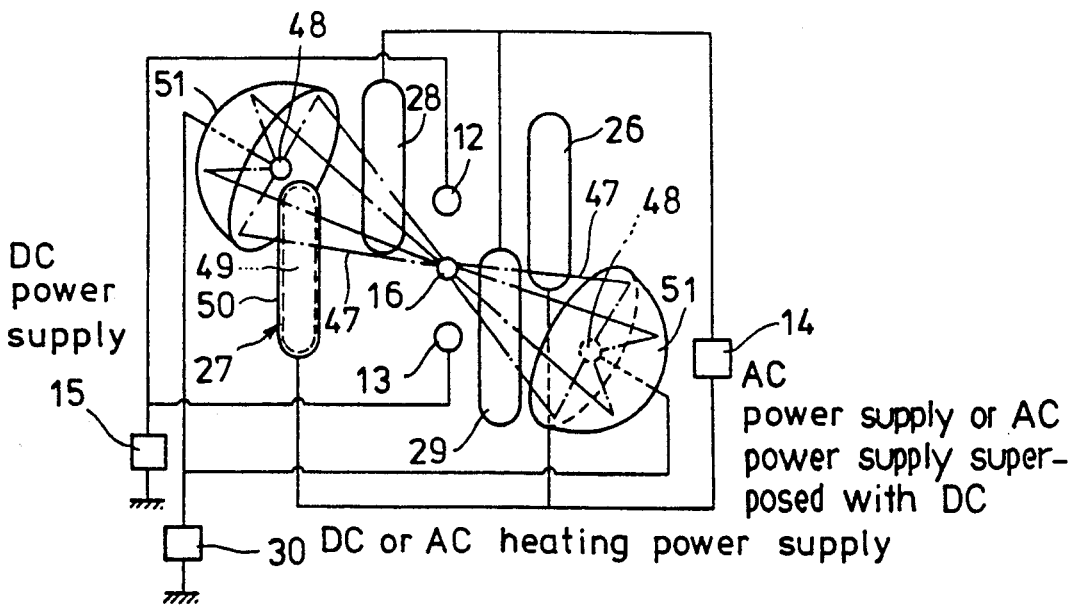
FIG. 13 is a view used to explain a second modification of the third embodiment shown in FIG. 10.

FIG. 13 illustrates a second modification of the third embodiment in which the first electrodes 26-29 are in the form of a transparent electrode comprising qualz glass 49 coated with transparent, conductive coating 50 such as NESA-coat like $S_nO_2$, $I_nO_3+S_nO_2$ or $T_iO_2$ through sputtering, ion plating or baking. Semispherical reflectors 51 is used to radiate heat rays 47 from the sources 48 to the specimen 16. The second modification can attain the same effects as those attained by the third embodiment and has enhanced heat efficiency of the radiated rays 47 to the specimen 16 since the rays 47 are not shielded by the first electrodes 26-29 which are transparent.

Figure 14:
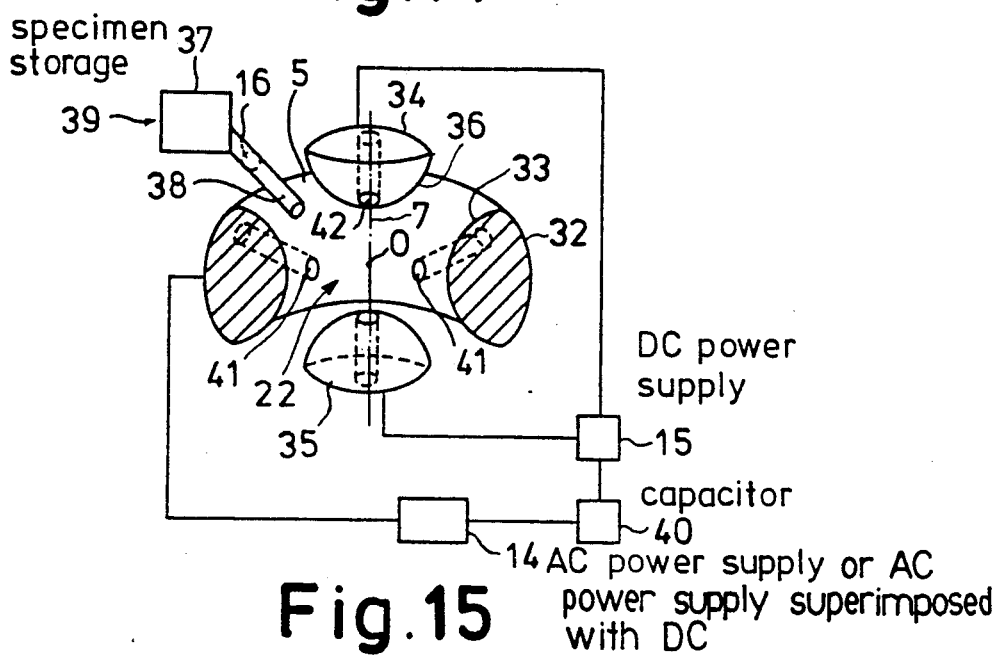
FIG. 14 is a view used to explain a fourth preferred embodiment of the present invention.
Figure 15:
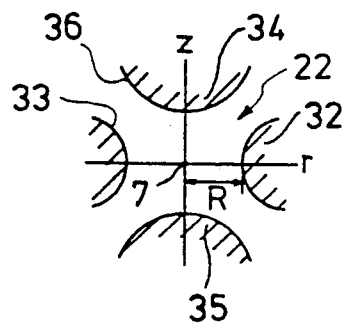
FIG. 15 is a view used to explain shapes of electrodes used in the fourth embodiment shown in FIG. 14.

The fourth embodiment of the present invention is illustrated in FIGS. 14 and 15 in which a first electrode 32 is in the form of a ring having an inner curved surface 33. Second electrodes 34 and 35 are in the form of a bowl with a semispherical surface 36 in opposed relationship with the similar surface of the opposed second electrodes 34 or 35. As shown in FIG. 15, in a coordinate system r-z where z represents the center axis 7, the electrodes 32, 33, 34, 35 and 36 satisfy the following equation.

$$r^2 - 2z^2 = \pm R^2$$

where R is an electrode constant and is one half of the inner diameter of the electrode 33. In order to introduce the specimen 16 into the space defined by the electrode 32, 34 and 35, there is provided a specimen introducer 39 comprising a specimen storage 37 and a nozzle 38 for discharging a specimen 16 toward the original point 0.

The second electrodes 34 and 35 are paired and are electrically connected to the AC power supply 14 to apply the AC voltage between the second electrode pair (34 and 35) and the first electrode 32. A capacitor 14 is inserted between the AC power supply 14 and the DC power supply 15 which in turn is adapted to apply DC voltage to the second electrodes 34 and 35 for charging the position of the specimen 16 with respect to the direction of the center axis 7.

Instead of the specimen introducer 39, openings 41 and 42 for introducing the specimens toward the original point 0 may be formed through the electrodes 32, 33 and 34.

It is to be noted that the surfaces 33 and 36 of the electrodes 32, 34 and 35 are not always defined by the above described equation $r^2 - 2z^2 = \pm R^2$ and any other curved surfaces may be used.

According to the fourth embodiment, the AC voltage from the supply 14 is applied between the first electrodes 32 and the second electrodes 34 and 35 disposed on the center axis 7 so that, like the other embodiments, the electric lines of force 17 is produced between the electrodes 32, 34 and 35, thereby retaining the specimen 16 in the stationary levitation state. Moreover, the specimen 16 is moved to the original point 0 by the electric force and can be retained there in the stationary levitation state. Once the specimen 16 reaches the original point 0, it can be maintained there without position-controlling of the specimen.

In this case, the position of the specimen 16 with respect to the direction of the center axis 7 may be changed by applying DC voltage from the DC power supply 15 to the second electrodes 34 and 35 for superposition of a DC component on AC component.

It is to be noted that the fourth embodiment may be modified similarly as described above with reference to the first and second modifications of the third embodiment so as to obtain a heating furnace.

Figure 16:
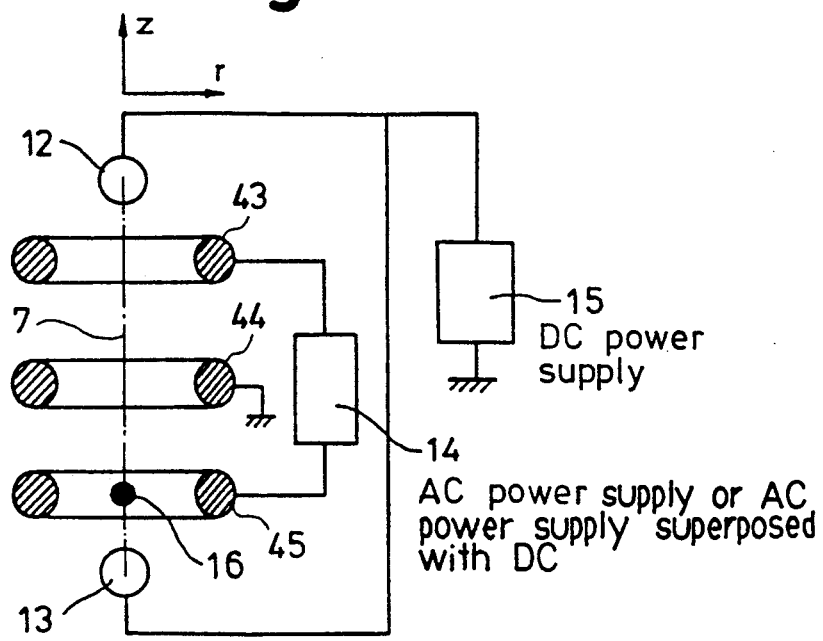
FIG. 16 is a view used to explain a fifth preferred embodiment of the present invention.

The fifth embodiment of the present invention is illustrated in FIG. 16 in which the DC voltage is applied from the DC power supply 15 to electrodes 12 13 disposed along the center axis 7 while the centrally located ring-shaped first electrode 44 is grounded and the other ring-shaped first electrodes 43 and 45 are electrically connected to the AC power supply 14.

The fifth embodiment with the above-described construction can attain the same effects as those attained by the other embodiments described above.

What is claimed is:

1. An electrostatic positioner comprising four first electrodes in the form of parallel bars which are located at vertexes of a square viewed from the direction of a center axis and are equidistantly and parallely spaced apart from said center axis to define an inner space; two second electrodes on said center axis and vertically spaced apart from each other as upper and lower electrodes; means for controlling a specimen by levitation and position control, said means including an AC power supply connected to said four first electrodes to supply an AC voltage alone or superposed to with a direct current to each pair of said first electrodes in diagonally opposed relationship with each other such that said each pair of said first electrodes have the same polarity so that electric lines of forces are produced therebetween to levitationally control a specimen in a direction perpendicular to the axis of said first four electrodes, a DC power supply connected to the second electrodes so that an electrical repelling force is produced between said second electrodes and the specimen to retain the specimen in a stationary levitation state in the direction of the axis;

said first four electrodes in the form of parallel bars with said AC power supply being arranged to surround a specimen with said upper and lower second electrodes with said DC power supply and means for providing heating to the specimen.

2. The positioner according to claim 1 wherein each of said first electrodes has an arcuate convex surface adjacent to said inner space and a flat surface away from said inner space.

3. The positioner according to claim 1 wherein said first electrodes are movable diagonally of said square.

4. The positioner according to claim 1 wherein said means for providing heat includes said first electrodes which emit heat and are electrically connected to a heating power supply.

5. The positioner according to claim 1 further comprising heating source means for radiating heat rays to the specimen in the inner space defined by said first electrodes.

6. The positioner according to claim 5 wherein the first electrodes are in the form of a transparent electrode and reflectors are provided to radiate heat rays from said heat source means to said specimen.

* * * * *